United States Patent
Kim et al.

(10) Patent No.: US 10,346,036 B2
(45) Date of Patent: Jul. 9, 2019

(54) APPARATUS AND METHOD OF EXECUTING PLURAL OBJECTS DISPLAYED ON A SCREEN OF AN ELECTRONIC DEVICE, AND COMPUTER-READABLE RECORDING MEDIUM FOR RECORDING THE METHOD

(71) Applicant: Samsung Electronics Co., Ltd., Gyeonggi-do (KR)

(72) Inventors: Moo-Young Kim, Seoul (KR); Hong-Seok Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 592 days.

(21) Appl. No.: 14/229,289

(22) Filed: Mar. 28, 2014

(65) Prior Publication Data
US 2014/0317542 A1  Oct. 23, 2014

(30) Foreign Application Priority Data

Apr. 18, 2013 (KR) .................. 10-2013-0042713

(51) Int. Cl.
*G06F 3/0481* (2013.01)
*G06F 3/0482* (2013.01)
*G06F 3/0488* (2013.01)
*G06F 3/0486* (2013.01)

(52) U.S. Cl.
CPC ........ *G06F 3/04886* (2013.01); *G06F 3/0486* (2013.01)

(58) Field of Classification Search
CPC .. G06F 3/04817; G06F 3/0482; G06F 3/0486; G06F 3/04886; H04N 21/47205; H04N 21/41407
See application file for complete search history.

(56) References Cited

U.S. PATENT DOCUMENTS

| | | | |
|---|---|---|---|
| 6,948,173 B1* | 9/2005 | Isom ..................... | G06F 9/4806 718/100 |
| 2007/0130541 A1* | 6/2007 | Louch ................. | G06F 3/04817 715/804 |
| 2009/0172594 A1* | 7/2009 | Chen ................... | G06F 3/04817 715/810 |
| 2010/0058215 A1 | 3/2010 | Chung et al. | |

(Continued)

FOREIGN PATENT DOCUMENTS

KR  1020090125470  12/2009
KR  1020100024642  3/2010

*Primary Examiner* — Tan H Tran
(74) *Attorney, Agent, or Firm* — The Farrell Law Firm, P.C.

(57) ABSTRACT

A method and an apparatus are provided for executing a plurality of objects displayed on a screen of an electronic device. The plurality of objects are displayed on the screen of the electronic device. Each of the plurality of objects is used to execute an application upon selection of a respective object. Information about a first object, of the plurality of objects, corresponding to a first application and information about a second object, of the plurality of objects, corresponding to a second application, are linked. Link information about the linked first and second objects is stored. The second application is executed upon receipt of a predetermined input value from an input means during execution of the first application.

22 Claims, 11 Drawing Sheets

(56) References Cited

U.S. PATENT DOCUMENTS

| | | | |
|---|---|---|---|
| 2010/0153877 A1* | 6/2010 | Rautava | G06F 9/4443 715/802 |
| 2010/0162270 A1* | 6/2010 | Bijlani | G06F 9/485 719/318 |
| 2010/0262928 A1* | 10/2010 | Abbott | G06F 3/04817 715/769 |
| 2010/0295805 A1 | 11/2010 | Shin et al. | |
| 2012/0005577 A1* | 1/2012 | Chakra | G06F 3/0486 715/702 |
| 2012/0036505 A1* | 2/2012 | Kaneko | G06F 9/445 717/174 |
| 2012/0052918 A1* | 3/2012 | Yang | G06F 3/04817 455/566 |
| 2012/0174007 A1* | 7/2012 | Lee | G06F 3/04817 715/765 |
| 2013/0254719 A1* | 9/2013 | Hanazaki | G06F 3/0486 715/846 |

\* cited by examiner

APPARATUS AND METHOD OF EXECUTING PLURAL OBJECTS DISPLAYED ON A SCREEN OF AN ELECTRONIC DEVICE, AND COMPUTER-READABLE RECORDING MEDIUM FOR RECORDING THE METHOD

PRIORITY

This application claims priority under 35 U.S.C. § 119(a) to a Korean patent application filed on Apr. 18, 2013 in the Korean Intellectual Property Office and assigned Serial No. 10-2013-0042713, the entire disclosure of which is incorporated herein by reference.

BACKGROUND OF THE INVENTION

1. Field of the Invention

The present invention relates generally to an electronic device, and more particularly, to an apparatus, a method, and a computer-readable recording medium for executing a plurality of objects displayed on a screen of an electronic device.

2. Description of the Related Art

A touch screen is configured by combining a touch panel with a display device. The touch screen is widely used in various electronic devices including, for example, a mobile device, a navigator, a TeleVision (TV), an Automatic Teller Machine (ATM) of a bank, a Point Of Sale (POS) device of a shop, and the like. Use of the touch screen is advantageous in that it allows for convenient user command input without the need for a keyboard or a mouse.

Since a mobile device provides additional services and functions, the mobile device provides Graphic User Interfaces (GUIs) on a touch screen.

Besides basic applications developed and installed in the mobile device by a manufacturer, the user of the mobile device can download applications from an application store over the Internet and install the applications in the mobile device. Ordinary developers may develop such applications and register them in application stores on the Web. Accordingly, anyone can sell developed applications to mobile users in application stores through the Internet. As a consequence, tens of thousands to hundreds of thousands of applications are available to mobile devices.

At least tens to hundreds of applications are stored in a mobile device such as, for example, a smartphone or a tablet Personal Computer (PC), and shortcut keys are displayed as icons to execute the individual applications on the touch screen of the mobile device. Thus, the user can execute an intended application in the mobile device by selecting (e.g., touching) an icon representing the application on the touch screen. Besides the shortcut keys, many other visual objects such as widgets, pictures, and documents are displayed on the touch screen of the mobile device.

During execution of a specific function and program, another application may need to be executed to view other information. Thus, the user moves a program being executed in the foreground to the background by pressing a predetermined button (e.g., a home key), invokes an idle screen, and then selects and executes the other application.

As described above, when a user wants to execute another function when a specific function and program is being executed, the user should invoke an idle screen by pressing a predetermined key such as, for example, a home key and then execute the intended function. Therefore, program switching and execution can become inconvenient for the user.

SUMMARY OF THE INVENTION

The present invention has been made to address at least the above problems and/or disadvantages and to provide at least the advantages described below. Accordingly, an aspect of the present invention provides an apparatus, a method, and a computer-readable recording medium for executing a plurality of objects displayed on a screen of an electronic device, in which information about a plurality of objects displayed on a screen of the electronic device is linked to each other. Upon receipt of a predetermined input value during execution of an application corresponding to a specific object, an application corresponding to an object linked to the specific object is immediately switched to and executed without invocation of an idle screen.

Another aspect of the present invention provides an apparatus, a method, and a computer-readable recording medium for executing a plurality of objects displayed on a screen of an electronic device, in which information about a plurality of objects displayed on a screen of the electronic device is linked to each other by moving at least one object to a specific object.

In accordance with an aspect of the present invention, an apparatus is provided for executing a plurality of objects displayed on a screen of an electronic device. The apparatus includes a display configured to display the plurality of objects on the screen of the electronic device, each of the plurality of objects being used to execute an application upon selection of a respective object. The apparatus also includes a controller configured to link information about a first object, of the plurality of objects, corresponding to a first application and information about a second object, of the plurality of objects, corresponding to a second application, to store link information about the linked first and second objects, and to control execution of the second application upon receipt of a predetermined input value from an input means during execution of the first application.

In accordance with another aspect of the present invention, a method is provided for executing a plurality of objects displayed on a screen of an electronic device. The plurality of objects is displayed on the screen of the electronic device. Each of the plurality of objects is used to execute an application upon selection of a respective object. Information about a first object, of the plurality of objects, corresponding to a first application and information about a second object, of the plurality of objects, corresponding to a second application, are linked. Link information about the linked first and second objects is stored. The second application is executed upon receipt of a predetermined input value from an input means during execution of the first application.

BRIEF DESCRIPTION OF THE DRAWINGS

The above and other aspects, features, and advantages of the present invention will be more apparent from the following description when taken in conjunction with the accompanying drawings, in which.

DETAILED DESCRIPTION OF EMBODIMENTS OF THE PRESENT INVENTION

Figure 1:
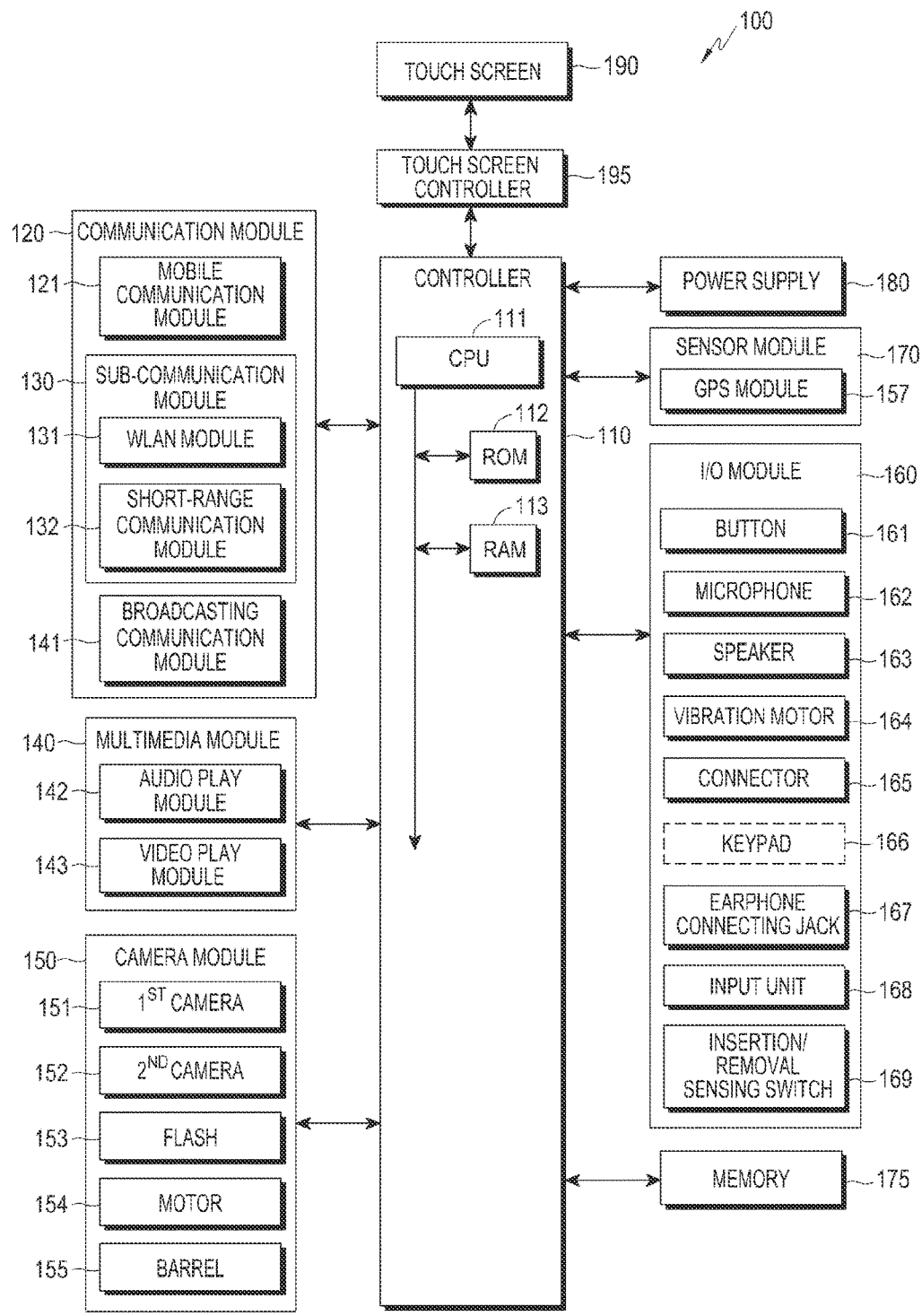
FIG. 1 is a block diagram illustrating a portable terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to the dictionary meanings, but, are merely used to enable a clear and consistent understanding of the invention.

It is to be understood that the singular forms "a," "an," and "the" include plural referents unless the context clearly dictates otherwise. Thus, for example, reference to "a component surface" includes reference to one or more of such surfaces.

By the term "substantially", it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present invention are provided to achieve the above-described technical aspects of the present invention. In an implementation, defined entities may have the same names, to which the present invention is not limited. Thus, embodiments of the present invention can be implemented with same or ready modifications in a system having a similar technical background.

Embodiments of the present invention provide an apparatus and a method of linking information about a plurality of objects displayed on a screen of an electronic device to each other. Upon receipt of a predetermined input value during execution of an application corresponding to a specific object, embodiments of the present invention provide an apparatus and a method for immediately switching to an application corresponding to an object linked to the specific object without invoking an additional screen (e.g., an idle screen).

In embodiments of the present invention, objects displayed on a screen may include a variety of visual objects such as, for example, shortcut icons representing applications available in an electronic device, widgets, icons representing text of various file formats, photos, folders, and the like. The objects may be arranged in a matrix on the screen, or may be arranged or scattered in any other form on the screen. In addition, the applications may include applications stored in the electronic device by a manufacturer of the electronic device. Additionally, the applications may include applications that a user has downloaded from application stores on Web sites through the Internet after purchasing the electronic device. Accordingly, each of the objects may be represented as an icon or button having at least one of an image, text, and a photo.

In an embodiment of the present invention, at least two of a plurality of objects displayed on a screen of an electronic device may be linked to each other. For example, one object may be moved to and overlapped over another object, and information about the two overlapped objects may be linked and stored. The moved object may be set as a slave object, and the object over which the moved object overlaps may be set as a master object, or vice versa. Upon receipt of a predetermined key (e.g., a plurality of keys in combination or a special key) during execution of an application corresponding to the master object, an application corresponding to the slave object linked to the master object is immediately executed. Likewise, a plurality of slave objects may be linked to one master object by overlapping the three or more objects. The execution order of applications corresponding to objects may be determined according to the linked order of the objects.

Objects may be overlapped in various manners to link information about the objects to each other. For example, when a screen of an electronic device is configured as a touch screen, one object may be selected, dragged to, and dropped on another object by means of an electronic pen or a hand, so that the objects are overlapped with each other.

In accordance with an embodiment of the present invention, when objects are overlapped with each other, the existence of at least one slave object linked to a specific master object may be indicated in a display area of the master object (e.g., in a grid area of the master object) on a screen. When two or more slave objects are linked to a master object, the number of the linked slave objects may be displayed on a screen (in a display area of the master object such as, for example, a grid area of the master object).

In embodiments of the present invention, an electronic device is any device equipped with a touch screen, which may also be referred to as a portable terminal, a mobile terminal, a communication terminal, a portable communication terminal, a portable mobile terminal, and the like. For example, an electronic device may be any type of device including a smartphone, a game console, a TV, a display device, a head unit for a vehicle, a laptop computer, a tablet PC, a Personal Media Player (PMP), a Personal Digital Assistant (PDA), a navigator, an ATM of a bank, a POS device of a shop, and the like. In embodiments of the present invention, an electronic device may be a flexible device or a flexible display device.

FIG. 1 is a block diagram illustrating a portable terminal according to an embodiment of the present invention.

Referring to FIG. 1, a portable terminal 100 may be connected to an external electronic device through at least one of a communication module 120, a connector 165, and an earphone connector jack 167. The external electronic device may be any one of a variety of devices that can be detachably connected to the portable terminal 100 by wire, such as, for example, an earphone, an external speaker, a Universal Serial Bus (USB) memory, a charger, a cradle, a docking station, a Digital Multimedia Broadcasting (DMB) antenna, a mobile payment device, a health care device (e.g., a blood sugar meter, etc.), a game console, a vehicle navigator, and the like. The external electronic device may also be a device wirelessly connectable to the portable terminal 100 by short-range communication, such as, for example, a Bluetooth communication device, a Near Field Communication (NFC) device, a Wireless Fidelity (Wi-Fi) Direct communication device, a wireless Access Point (AP), or the like. The portable terminal 100 may connected to another portable terminal or electronic device by wire or wirelessly, such as, for example, a portable phone, a smart phone, a tablet PC, a desktop PC, or a server.

The portable terminal 100 includes at least one touch screen 190 and at least one touch screen controller 195. The portable terminal 100 further includes a controller 110, the communication module 120, a multimedia module 140, a camera module 150, an Input/Output (I/O) module 160, a sensor module 170, a memory (storage) 175, and a power supply 180. The communication module 120 includes a mobile communication module 121, a sub-communication module 130, and a broadcasting communication module 141. The sub-communication module 130 includes at least one of a Wireless Local Area Network (WLAN) module 131 and a short-range communication module 132. The multimedia module 140 includes at least one of an audio play module 142 and a video play module 143. The camera module 150 includes at least one of a first camera 151 and a second camera 152. The I/O module 160 includes at least one of buttons 161, a microphone 162, a speaker 163, a vibration device 164, the connector 165, and a keypad 166.

The controller 110 includes a Central Processing Unit (CPU) 111, a Read Only Memory (ROM) 112, and a Random Access Memory (RAM) 113. The ROM 112 stores a control program to control the portable terminal 100. The RAM 113 stores signals or data received from the outside of the portable terminal 100, or is used as a memory space for an operation performed by the portable terminal 100. The CPU 111 may include one or more cores. The CPU 111, the ROM 112, and the RAM 113 may be connected to one another through an internal bus.

The controller 110 may control the communication module 120, the multimedia module 140, the camera module 150, the I/O module 160, the sensor module 170, the memory 175, the power supply 180, the touch screen 190, and the touch screen controller 195.

In an embodiment of the present invention, when a specific object selected from among a plurality of objects displayed on the touch screen 190 is moved to overlap another object, the controller 110 sets up a link between information about the overlapped objects. Upon receipt of a predetermined input value during execution of a specific object to which another object is linked, the controller 110 may control immediate switching and execution of an application corresponding to the object linked to the specific object in an embodiment of the present invention.

In an embodiment of the present invention, the input value may be input by a user on the touch screen 190, a gesture input through the camera module 150, a switch or button input through the buttons 161 or the keypad 166, voice input through the microphone 162, or the like.

The controller 110 may sense a user input event such as, for example, a hovering event that is generated when an input unit 168 approaches the touch screen 190 from above or is located nearby above the touch screen 190. Upon generation of a user input event in a predetermined manner, the controller 110 may control a function of switching to an application corresponding to the user input event and executing the application.

The controller 110 may detect various user inputs received through the camera module 150, the I/O module 160, and the sensor module 170, as well as the touch screen 190. The user inputs may include various types of information input to the portable terminal 100 such as, for example, a touch, a user gesture, a voice, eye movement, iris recognition, a vital signal, and the like. The controller 110 may control execution of a predetermined action or function corresponding to a detected user input in the portable terminal 100.

The controller 110 may output a control signal to the input unit 168 or the vibration device 164. The control signal may include information about a vibration pattern, and thus, the input unit 168 or the vibration device 164 generates vibrations according to the vibration pattern. The information about the vibration pattern may specify the vibration pattern itself, an ID of the vibration pattern, or the like. Or this control signal may include only a vibration generation request.

The portable terminal 100 may include at least one of the mobile communication module 121, the WLAN module 131, and the short-range communication module 132, according to its capabilities.

The mobile communication module 121 connects the portable terminal 100 to an external electronic device through one or more antennas by mobile communication under the control of the controller 110. The mobile communication module 121 may transmit wireless signals to or may receive wireless signals from a portable phone, a smart phone, a tablet PC, or another electronic device that has a phone number input to the portable terminal 100, for a voice call, a video call, a Short Message Service (SMS), or a Multimedia Messaging Service (MMS).

The sub-communication module 130 may include at least one of the WLAN module 131 and the short-range communication module 132. For example, the sub-communication module 130 may include only the WLAN module 131, only the short-range communication module 132, or both the WLAN module 131 and the short-range communication module 132.

The WLAN module 131 may be connected to the Internet under the control of the controller 110 in a place where a wireless AP is installed. The WLAN module 131 supports the WLAN standard, Institute of Electrical and Electronics Engineers (IEEE) 802.11x. The short-range communication module 132 may conduct short-range wireless communication between the portable terminal 100 and an external electronic device under the control of the controller 110. The short-range communication may conform to Bluetooth, Infrared Data Association (IrDA), Wi-Fi Direct, NFC, etc.

The broadcasting communication module 141 may receive a broadcast signal (e.g., a TV broadcast signal, a radio broadcast signal, or a data broadcast signal) and additional broadcasting information (e.g., an Electronic Program Guide (EPG) or Electronic Service Guide (ESG)) from a broadcasting station through a broadcasting communication antenna under the control of the controller 110.

The multimedia module 140 may include the audio play module 142 or the video play module 143. The audio play module 142 may open a stored or received digital audio file (e.g., a file having such an extension as mp3, wma, ogg, or wav) under the control of the controller 110. The video play module 143 may open a stored or received digital video file (e.g., a file having an extension such as mpeg, mpg, mp4, avi, mov, or mkv) under the control of the controller 110.

The multimedia module 140 may be incorporated into the controller 110. The camera module 150 may include at least one of the first camera 151 and the second camera 152, to capture a still image or a video under the control of the controller 110. The camera module 150 may include at least one of a barrel 155 to zoom in or zoom out an object during capturing the object, a motor 154 to control movement of the barrel 155, and a flash 153 to provide an auxiliary light source required for capturing an image. The first camera 151 may be disposed on the front surface of the portable terminal 100, while the second camera 152 may be disposed on the rear surface of the device 100.

The I/O module 160 may include at least one of the plurality of buttons 161, the at least one microphone 162, the at least one speaker 163, the at least one vibration device 164, the connector 165, the keypad 166, the earphone connector jack 167, and the input unit 168. The I/O module 160 is not limited thereto and a cursor control such as a mouse, a track ball, a joystick, or cursor directional keys may be provided to control movement of a cursor on the touch screen 190.

The buttons 161 may be formed on the front surface, a side surface, or the rear surface of a housing (or case) of the portable terminal 100, and may include at least one of a power/lock button, a volume button, a menu button, a home button, a back button, and a search button. The microphone 162 may receive a voice or a sound, and may convert the received voice or sound to an electrical signal under the control of the controller 110. The speaker 163 may output sounds corresponding to various signals or data (e.g., wireless data, broadcast data, digital audio data, digital video data, etc.) to the outside of the portable terminal 100 under the control of the controller 110. The speaker 163 may output sounds corresponding to functions (e.g., a button manipulation sound, a ringback tone, a voice from the other party, etc. in a call) performed by the portable terminal 100. One or more speakers 163 may be disposed at an appropriate position or positions of the housing of the portable terminal 100.

The vibration device 164 may convert an electrical signal to a mechanical vibration under the control of the controller 110. For example, when the portable terminal 100 receives an incoming voice call or video call from another device in a vibration mode, the vibration device 164 operates. One or more vibration devices 164 may be mounted inside the housing of the portable terminal 100. The vibration device 164 may operate in response to a user input on the touch screen 190.

The connector 165 may be used as an interface to connect the portable terminal 100 to an external electronic device or a power source. The controller 110 may transmit data stored in the memory 175 to the external electronic device or receive data from the external electronic device via a cable connected to the connector 165. The portable terminal 100 may receive power or charge a battery from the power source via the cable connected to the connector 165.

The keypad 166 may receive a key input from the user to control the portable terminal 100. The keypad 166 may include a physical keypad formed in the portable terminal 100 or a virtual keypad displayed on the touch screen 190. The physical keypad may not be provided according to the capabilities or configuration of the portable terminal 100. An earphone may be inserted into the earphone connector jack 167 and thus connected to the portable terminal 100.

The input unit 168 may be inserted and kept in the portable terminal 100. When the input unit 168 is used, it may be extended or removed from the portable terminal 100. An insertion/removal sensing switch 169 is provided in an internal area of the portable terminal 100 into which the input unit 168 is inserted, in order to operate in response to insertion and removal of the input unit 168. The insertion/removal sensing switch 169 may output signals corresponding to insertion and removal of the input unit 168 to the controller 110. The insertion/removal sensing switch 169 may be configured so as to directly or indirectly contact the input unit 168, when the input unit 168 is inserted. Therefore, the insertion/removal sensing switch 169 may output, to the controller 110, a signal corresponding to insertion or removal of the input unit 168 (i.e., a signal indicating insertion or removal of the input unit 168) depending on whether the insertion or removal of the input unit 168 contacts the input unit 168.

The sensor module 170 includes at least one sensor to detect a state of the portable terminal 100. For example, the sensor module 170 may include a proximity sensor that detects whether the user is close to the portable terminal 100, an illuminance sensor that detects the amount of ambient light around the portable terminal 100, a motion sensor that detects a motion of the portable terminal 100 (e.g., rotation, acceleration or vibration of the portable terminal 100), a geo-magnetic sensor that detects a point of the compass of the portable terminal 100 using the earth's magnetic field, a gravity sensor that detects the direction of gravity, an altimeter that detects an altitude by measuring the air pressure, and a Global Positioning System (GPS) module 157.

The GPS module 157 may receive signal waves from a plurality of GPS satellites in Earth orbit and calculate a position of the portable terminal 100 based on the Time of Arrivals (ToAs) of satellite signals from the GPS satellites to the portable terminal 100.

The memory 175 may store input/output signals or data in accordance with operations of the communication module 120, the multimedia module 140, the camera module 150, the I/O module 160, the sensor module 170, and the touch screen 190 under the control of the controller 110. The memory 175 may store a control program to control the portable terminal 100 or the controller 110, and applications.

The term "memory" covers the memory 175, the ROM 112 and the RAM 113 within the controller 110, or a memory card (e.g., a Secure Digital (SD) card or a memory stick) mounted to the portable terminal 100. The memory may include a non-volatile memory, a volatile memory, a Hard Disk Drive (HDD), or a Solid State Drive (SSD).

The memory 175 may store applications having various functions such as, for example, navigation, video call, game, and time-based alarm applications, images used to provide GUIs related to the applications, user information, text, databases or data related to a method of processing a touch input, background images (e.g., a menu screen, a waiting screen, and the like) or operation programs required to operate the terminal 100, and images captured by the camera module 150.

When a link is set up between objects on a screen, according to an embodiment of the present invention, the memory 175 may further store link information and link order information about each object.

The memory 175 is a machine-readable medium (e.g., a computer-readable medium). A machine-readable medium may be defined as a medium that provides data to a machine so that the machine may perform a specific function. The memory 175 may include a volatile medium and a non-volatile medium. All these media should be a type that transfers commands detectable by a physical device that reads the commands to the machine.

The machine-readable medium includes, but is not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), a Flash-EPROM, and an embedded Multi Media Card (eMMC).

The power supply 180 may supply power to one or more batteries mounted in the housing of the portable terminal 100 under the control of the controller 110. The one or more batteries supply power to the portable terminal 100. Further, the power supply 180 may supply power received from an external power source via the cable connected to the connector 165 to the portable terminal 100. The power supply 180 may also supply power received wirelessly from the external power source to the portable terminal 100 by a wireless charging technology.

The portable terminal 100 may include the at least touch screen 190 that provides Graphical User Interfaces (GUIs) corresponding to various services (e.g., call, data transmission, broadcasting, photo shot, etc.). The touch screen 190 may output an analog signal corresponding to at least one user input to a GUI to the touch screen controller 195.

The touch screen 190 may receive at least one user input through a user's body (e.g., a finger) or the input unit 168 (e.g., a stylus pen, an electronic pen, etc.). The touch screen 190 may be implemented as, for example, a resistive type, a capacitive type, an infrared type, an acoustic wave type, or in a combination thereof.

The touch screen 190 may include at least two touch panels that sense a finger's touch or proximity and a touch or proximity of the input unit 168 in order to receive inputs of the finger and the input unit 168. The at least two touch panels may provide different output values to the touch screen controller 195, and the touch screen controller 195 may distinguish a finger's input to the touch screen 190 from an input of the input unit 168 to the touch screen 190 by identifying the different values received from the at least two touch screen panels.

The touch may include a non-contact touch (e.g., a detectable gap between the touch screen 190 and the user's body part or a touch input means is 1 mm or less), not limited to contacts between the touch screen 190 and the user's body part or the touch input means. The gap detectable to the touch screen 190 may vary according to the capabilities or configuration of the portable terminal 100.

The touch screen controller 195 converts an analog signal received from the touch screen 190 to a digital signal. The controller 110 may control the touch screen 190 using the digital signal received from the touch screen controller 195. The touch screen controller 195 may control a hovering gap or distance as well as a user input position by detecting a value output from the touch screen 190 (e.g. a current value, tec.), convert the hovering gap or distance to a digital signal (e.g. a z coordinate), and provide the digital signal to the controller 110. Further, the touch screen controller 195 may detect a value output from the touch screen 190 (e.g. a current value, etc.), detect pressure applied to the touch screen 190 by the user input means, convert the detected pressure value to a digital signal, and provide the digital signal to the controller 110.

Figure 2:
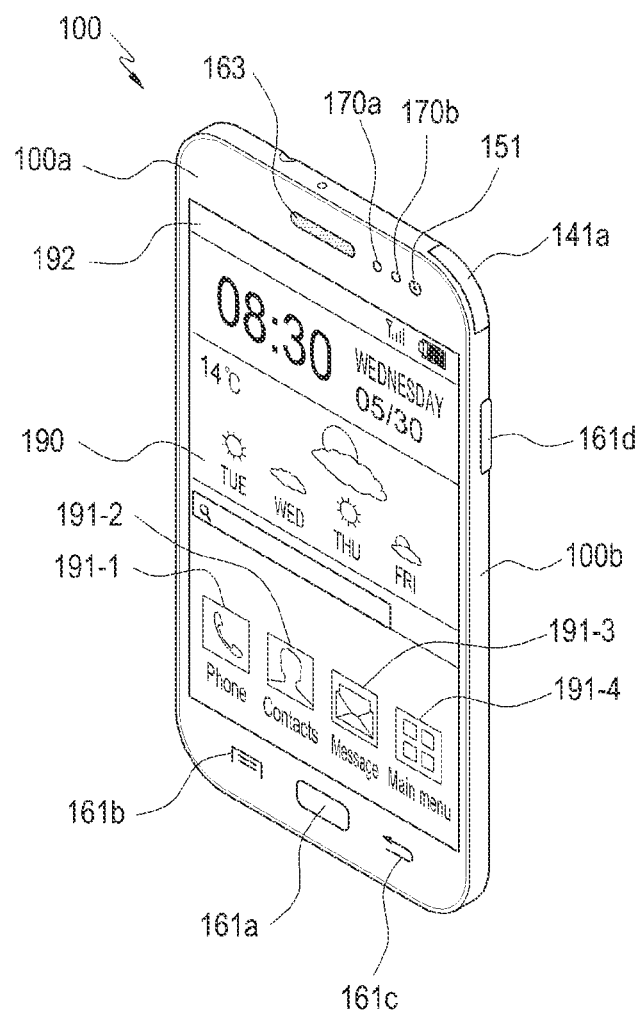
FIG. 2 is a diagram illustrating a front perspective view of a portable terminal, according to an embodiment of the present invention.
Figure 3:
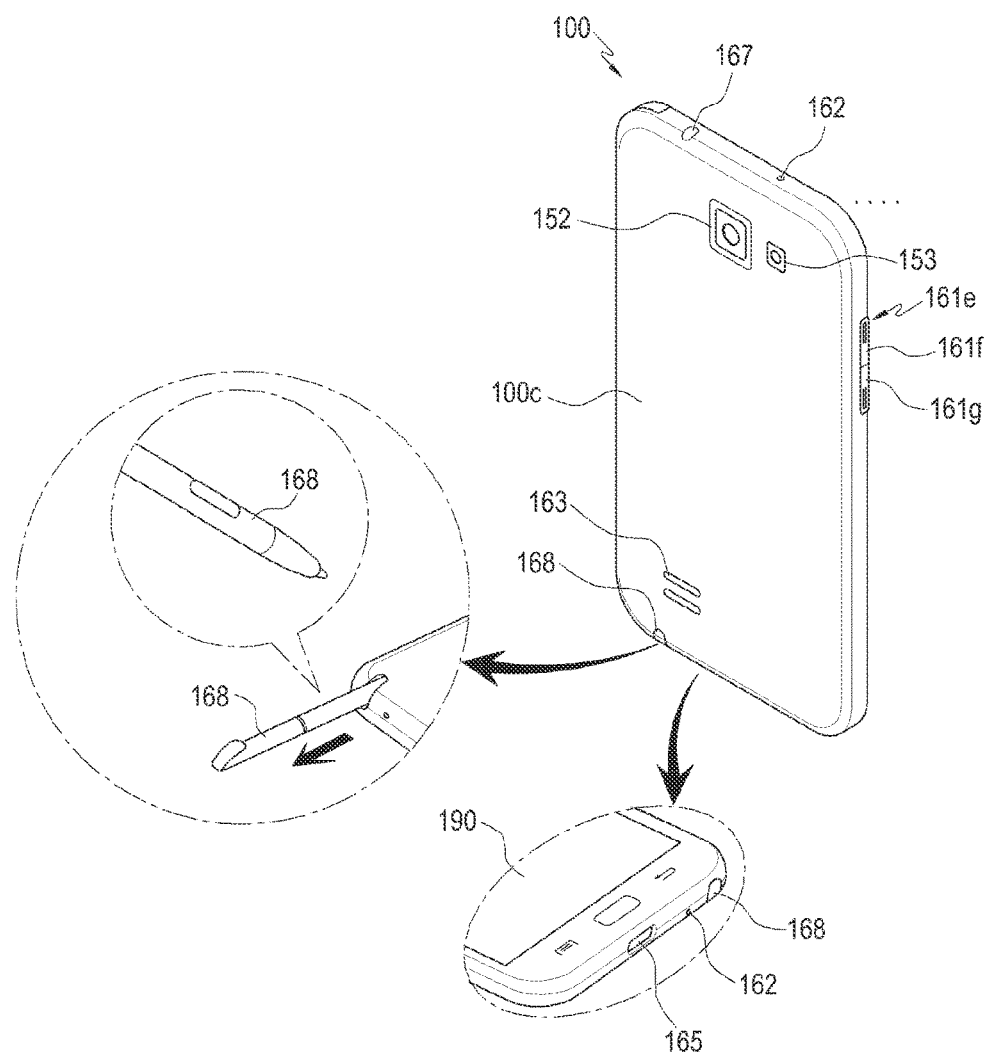
FIG. 3 is a diagram illustrating a rear perspective view of a portable terminal, according to an embodiment of the present invention.

FIGS. 2 and 3 are front and rear perspective views, respectively, of a portable terminal, according to an embodiment of the present invention.

Referring to FIGS. 2 and 3, the touch screen 190 is disposed at the center of the front surface 100a of the portable terminal 100, occupying almost the entirety of the front surface 100a. In FIG. 2, a main home screen is displayed on the touch screen 190, by way of example. The main home screen is the first screen to be displayed on the touch screen 190, when the portable terminal 100 is powered on. When the portable terminal 100 has different home screens of a plurality of pages, the main home screen may be the first of the home screens of the plurality of pages. Shortcut icons 191-1, 191-2 and 191-3 used to execute frequently used applications, a main menu switch key 191-4, time, weather, and the like may be displayed on the home screen. Upon user selection of the main menu switch key 191-4, a menu screen is displayed on the touch screen 190. A status bar 192 may be displayed at the top of the touch screen 190 in order to indicate states of the portable terminal 100 such as, for example, a battery charged state, a received signal strength, and a current time.

A home button 161a, a menu button 161b, and a back button 161c may be formed at the bottom of the touch screen 190. The home button 161a is used to display the main home screen on the touch screen 190. For example, upon selection of the home button 161a while any home screen other than the main home screen or the menu screen is displayed on the touch screen 190, the main home screen may be displayed on the touch screen 190. Upon selection of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus that can be displayed on the touch screen 190. The link menus may include a widget adding menu, a background changing menu, a search menu, an edit menu, an environment setting menu, and the like.

The back button 161c may display the screen previous to a current screen or end the latest used application.

The first camera 151, an illuminance sensor 170a, and a proximity sensor 170b may be arranged at a corner of the front surface 100a of the portable terminal 100, whereas the second camera 152, a flash 153, and the speaker 163 may be arranged on a rear surface 100c of the portable terminal 100.

For example, a power/lock button 161d, a volume button 161e, including a volume up button 161f and a volume down button 161g, a terrestrial DMB antenna 141a that receives a broadcast signal, and one or more microphones 162 may be disposed on side surfaces 100b of the portable terminal 100. The DMB antenna 141a may be mounted to the portable terminal 100 fixedly or detachably.

The connector 165 is formed on the bottom side surface of the portable terminal 100. The connector 165 may include a plurality of electrodes and may be connected to an external device by wire. The earphone connector jack 167 may be formed on the top side surface of the portable terminal 100, in order to allow an earphone to be inserted.

The input unit 168 may be inserted into the bottom side surface of the portable terminal 100. The input unit 168 may be inserted and kept inside the portable terminal 100. When the input unit 168 is used, the input unit may be extended and removed from the portable terminal 100.

Figure 4:
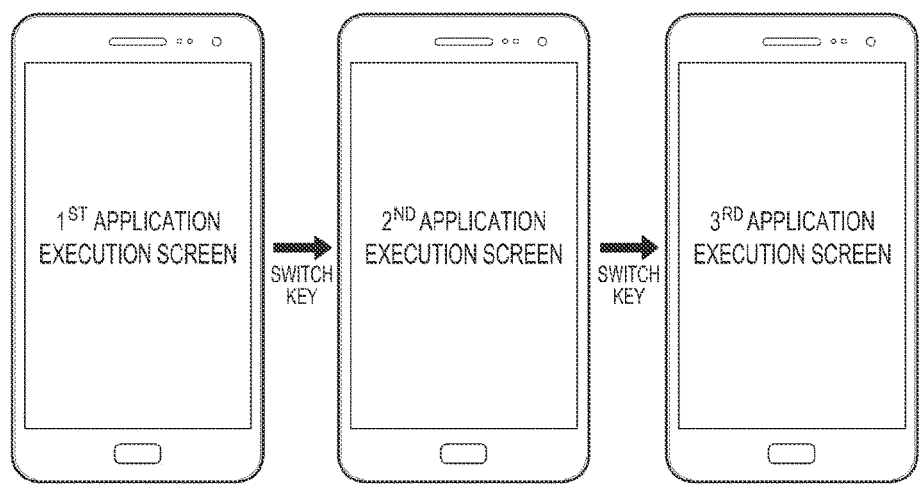
FIG. 4 is a diagram illustrating execution of linked applications, according to an embodiment of the present invention.

FIG. 4 is a diagram illustrating execution of linked applications, according to an embodiment of the present invention. Referring to FIG. 4, upon input of a predetermined switch key during execution of a first application in an electronic device (e.g., a smartphone), a second application linked to the first application may be executed immediately. Likewise, upon input of the predetermined switch key during execution of the second application, a third application linked to the second application may be executed immediately. When the first, second, and third applications are sequentially linked in this manner, upon input of the predetermined switch key during execution of the third application, the first application may be executed immediately. When execution switching occurs between a previous application and a new application by the switch key, a screen may switch to the new application during execution of the previous application, in an embodiment of the present invention. In another embodiment of the present invention, after the previous application is terminated, the new linked application may be executed.

In an embodiment of the present invention, when an ongoing specific application linked to other applications is terminated, the other linked applications may also be terminated. In another embodiment of the present invention, only the termination-requested specific application may be terminated and at least one of the other linked applications may be switched to and executed.

Previously, when the second application is to be executed during execution of the first application, the first application should be terminated and then the second application should be executed on a main screen, or an idle screen should be invoked and then the second application should be detected and executed. In contrast, links are established between applications that are expected to be frequently used together and an application linked to a specific application is immediately executed without an additional manipulation or screen switching, in response to input of a predetermined switch key during execution of the specific application in embodiments of the present invention.

The switch key used for switching between executions of applications may be a predetermined key or a set of predetermined keys (e.g., long pressing of a home key or simultaneous pressing of the home key and a side key) in the electronic device. When the screen of the electronic device is configured as a touch screen, a predetermined button displayed on the screen may act as the switch key. In the present invention, the 'switch key' is not limited to a specific key, and as long as it can generate an input value to switch execution of one application to execution of another application in the electronic device in various input manners, any type of input means may be used as the switch key of the present invention. For example, a motion input or a hovering input of an electronic pen may be set as input of the switch key, in an embodiment of the present invention.

An apparatus and methods according to embodiments of the present invention are described in detail below with reference to FIGS. 5 to 7.

Figure 5:
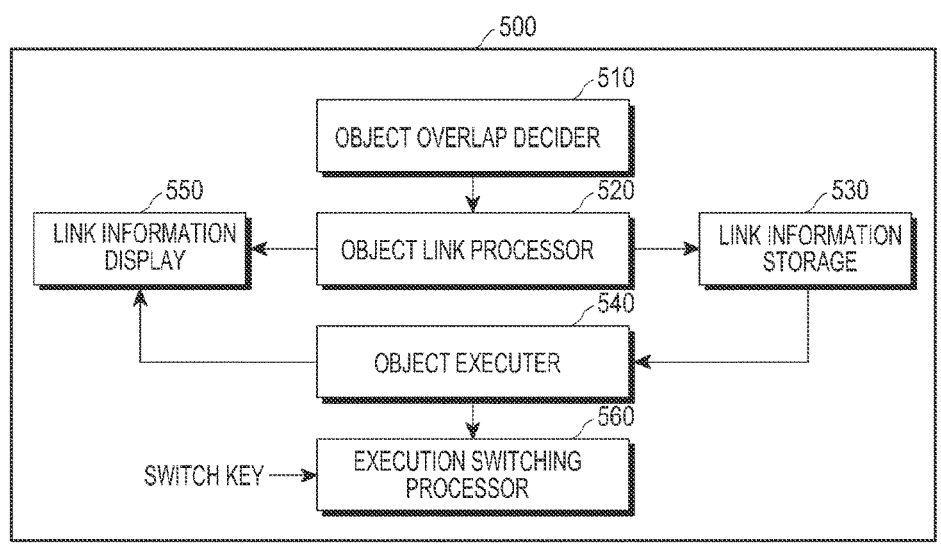
FIG. 5 is a block diagram illustrating an apparatus for executing a plurality of objects displayed on a screen of an electronic device, according to an embodiment of the present invention.

FIG. 5 is a block diagram of an apparatus for executing a plurality of objects displayed on a screen of an electronic device, according to an embodiment of the present invention. Referring to FIG. 5, an apparatus 500 of executing a plurality of objects displayed on a screen of an electronic device, according to an embodiment of the present invention, may include an object overlap decider 510, an object link processor 520, a link information storage 530, an object executer 540, a link information display 550, and an execution switching processor 560. Each component of the apparatus 500 may be incorporated into any of the controller 110, a display (e.g., the touch screen 190), and the memory 175 of the electronic device 100 illustrated in FIG. 1.

The object overlap decider 510 senses movement of any one of a plurality of objects displayed on a screen, and determines whether a plurality of objects are overlapped with each other due to the movement of the object. For example, the object overlap decider 510 may determine whether first and second objects are overlapped by checking whether the first and second objects are within a predetermined distance.

When the object overlap decider 510 determines that two objects are overlapped, the object link processor 520 links information about the two overlapped objects and stores link information about the two objects in the link information storage 530.

Figure 9:
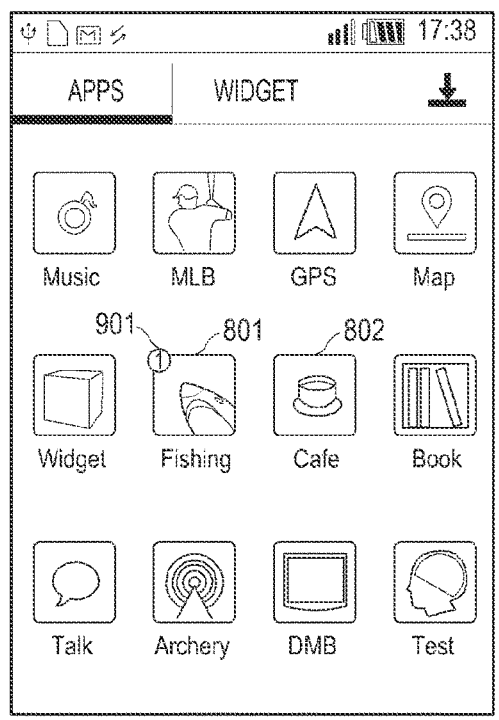
Figure 12:
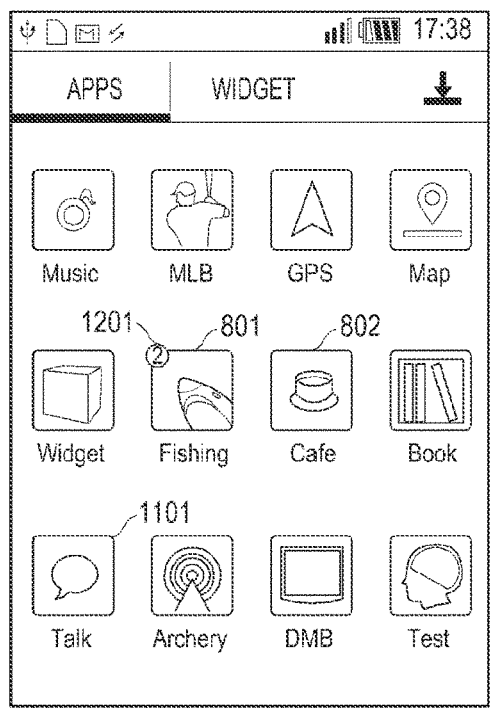

The link information display 550 may indicate the existence of an object linked to the first or second object on a screen. For example, when the second object is moved to and overlaps over the first object, the existence of another object linked to the first object (i.e., the second object) may be indicated in a display area of the first object. As illustrated in FIGS. 9 and 12, a numeral indicating the number of objects linked to a specific object may be displayed in an embodiment of the present invention.

When a specific object having a linked object is selected, the object executer 540 may execute the specific object or display the object linked to the specific object on the link information display 550.

Upon input of a predetermined input value (e.g., a value input by a predetermined key referred to as a 'switch key') during execution of the first object having the second object as its linked object, the execution switching processor 560 executes a second application corresponding to the second object linked to the first object.

The components of the apparatus 500 are shown separately in FIG. 4 to indicate that they may be separated functionally and logically. However, the components of the apparatus 500 are not necessarily configured as physical separate devices or codes.

In the disclosure, each function unit may refer to a functional and structural combination of hardware that implements the technical spirit of the present invention and software that operates the hardware. For example, each function unit may be a logical unit of a specific code and hardware resources needed to implement the code. Those skilled in the art will readily understand that a function unit is not always a physically connected code or a single type of hardware.

Figure 6:
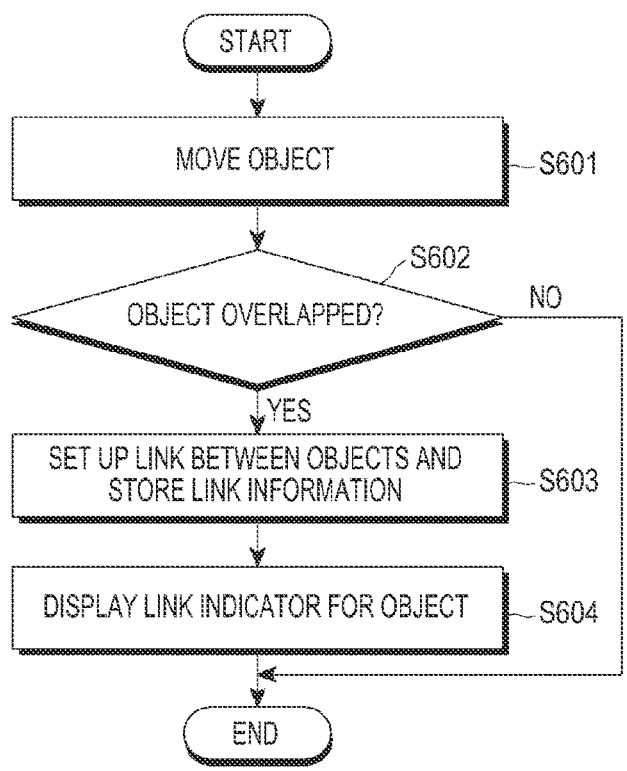
FIG. 6 is a flowchart illustrating an operation of linking a plurality of objects displayed on a screen of an electronic device, according to an embodiment of the present invention.

FIG. 6 is a flowchart illustrating an operation of linking a plurality of objects displayed on a screen of an electronic device, according to an embodiment of the present invention.

Referring to FIG. 6, a plurality of objects are displayed on a screen of the electronic device. A specific object is moved on the screen by a user input means, in step S601. In step S602, it is determined whether the specific object overlaps another object. When the specific object does not overlap another object, the methodology terminates. When the specific object overlaps another object, a link is established between information about the overlapped objects and information about the link is stored, in step S603. Once another object is linked to a specific object in this manner, it may be indicated on the screen that the specific object has a linked object, in step S604.

Figure 7:
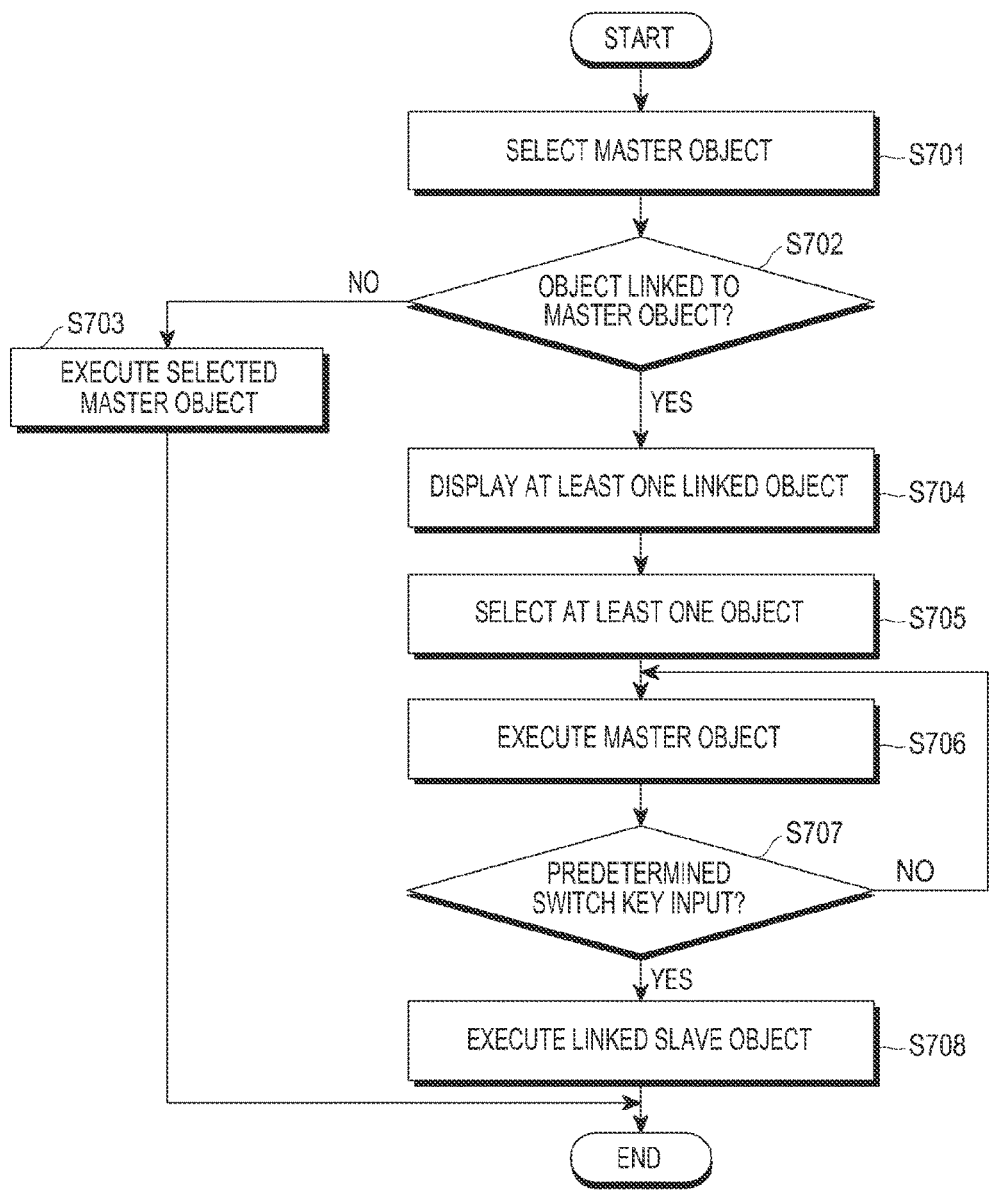
FIG. 7 is a flowchart illustrating an operation of executing a plurality of objects displayed on a screen of an electronic device, according to an embodiment of the present invention.

FIG. 7 is a flowchart illustrating an operation of executing a plurality of objects displayed on a screen of an electronic device, according to an embodiment of the present invention.

Referring to FIG. 7, after a link is established between objects as illustrated in FIG. 6, when an object is executed, another object linked to the executed object may be executed simply by input of a predetermined switch key.

A specific object is selected from among a plurality of objects (i.e., master objects) displayed on a screen, in step S701. In step S702, it is determined whether there is any object linked to the specific object. In the absence of any linked object, the selected master object is executed, in step S703.

In the presence of at least one linked object (i.e., at least one slave object), the at least one linked object is displayed on the screen, in step S704. The master object inclusive of at least one displayed slave object, in step S705. An application corresponding to the master object is executed, in step S706.

In step S707, it is determined whether a predetermined switch key is input during execution of the application corresponding to the master object. When the predetermined switch key is input, an application corresponding to a slave object linked to the master object corresponding to the currently executed application is executed without additional screen switching, in step S708. When the predetermined switch key is not input, the methodology returns to step S706 where the master object is executed.

The method for executing a plurality of objects displayed on a screen of an electronic device, according to an embodiment of the present invention, may be implemented as code that can be written on a computer-readable recording medium, and thus read by a computer. The computer-readable recording medium may include at least one of a program command, a data file, and a data structure, etc. The program command written to the medium may be specially designed and configured for the present invention or may be known to those skilled in software. Examples of the computer-readable recording medium include, for example, magnetic media such as a hard disk, a floppy disk, and a magnetic tape, optical media such as a CD-ROM and a Digital Versatile Disk (DVD), magneto-optical media such as a floptical disk, and memories such as a ROM, a RAM, and a flash memory. Examples of the program code include a premium language code executable by a computer using an interpreter as well as a machine language code written by a compiler. The hardware device can be configured so as to operate as one or more software modules in order to implement embodiments of the present invention or vice versa.

FIGS. 8 to 16 illustrate screens of an electronic device, according to embodiments of the present invention.

Figure 8:
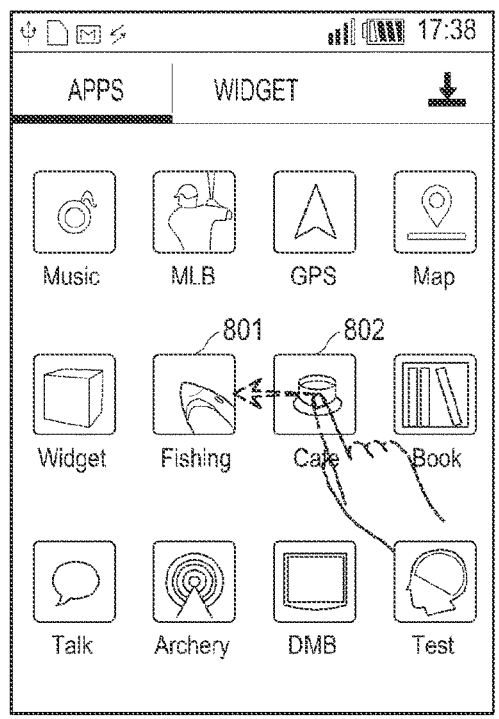
FIGS. 8 to 16 illustrate screens of an electronic device, according to embodiments of the present invention.

Referring to FIG. 8, a plurality of icons is displayed as an example of a plurality of objects on the screen of the electronic device. Each icon represents a specific application, and the application is executed by selecting the icon using a user input means.

While a plurality of objects are configured as icons in FIG. 8, in an embodiment of the present invention, objects of the present invention are not limited to icons. For example, the plurality of objects may include a variety of visual objects such as shortcut icons used to execute applications, widgets, icons representing text of various file formats, photos, folders, and the like, or may include a selected part of the visual objects. The applications, which can be executed in the portable terminal 100, are stored in the portable terminal 100 or downloadable to the portable terminal 100 from an external application providing Web server.

In FIGS. 8 to 16, the objects are shortcut icons used to execute applications, displayed on the touch screen 190.

Referring to FIG. 8, a first object 801 may be an icon representing a fishing game application, and a second object 802 may be an icon representing an application related to connection to a specific café in an Internet portal site.

In an embodiment of the present invention, when the second object 802 is dragged to the first object 801, and thus, overlaps over the first object 801, a link is established between information about the first object 801 and information about the second object 802.

In an embodiment of the present invention, the moved second object 802 may be linked to the stationary first object 801. Thus, the first object 801 may be set as a master object and the second object 802 may be set as a slave object.

Once a link is established between the first object 801 and the second object 802, the existence of another object linked to the first object 801 (i.e., the second object 802) may be indicated. For example, the existence of an object linked to the first object 801 may be indicated by displaying a link indicator 901 in a display area of the first object 801, as illustrated in FIG. 9. In FIG. 9, number '1' is displayed as the link indicator 901 in order to indicate that a single object is linked to the first object 801.

Figure 10:
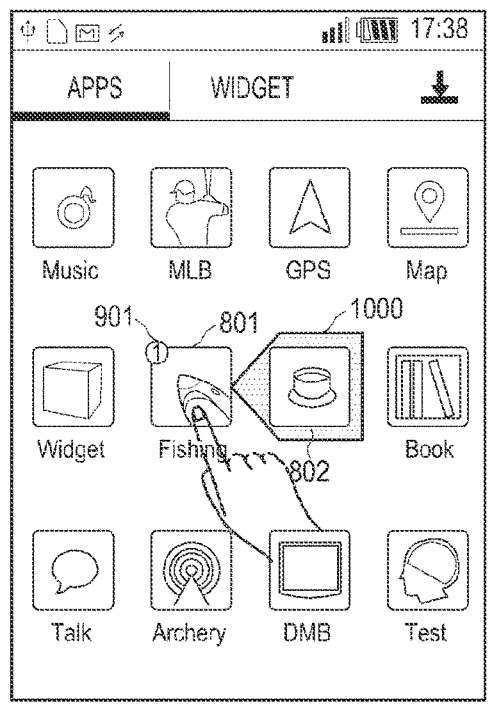

Referring to FIG. 10, upon selection of the first object 801 (i.e., the master object) having the second object 802 as a linked object by the user input means, the second object 802 may be displayed in an additional linked object display window 1000, rather than immediately executing an application corresponding to the first object 801. Therefore, the user may view the link indicator 901 displayed in the first object 801 and select the first object 801 to thereby identify an object linked to the first object 801 in the linked object display window 1000.

In an embodiment of the present invention, when a user selects a specific object, when at least one other object is linked to the specific object, the at least one other linked object may be displayed in the linked object display window 1000, as illustrated in FIG. 10, rather than immediately executing an application corresponding to the selected object. On the contrary, in the absence of any other object linked to the selected object, the application corresponding to the selected object may be immediately executed.

In another embodiment of the present invention, many selection methods are set to select a specific object. A first selection method may be designed so that an application corresponding to a selected application is executed, and a second selection method may be designed so that an object linked to a selected application is displayed. For example, when the first object 801 is touched for a short time, the first application corresponding to the first object 801 may be executed. When the first object 801 is touched for a long time, i.e., a predetermined time or longer, at least one object (e.g., the second object 802 in FIG. 10) linked to the first object 801 may be displayed.

Figure 11:
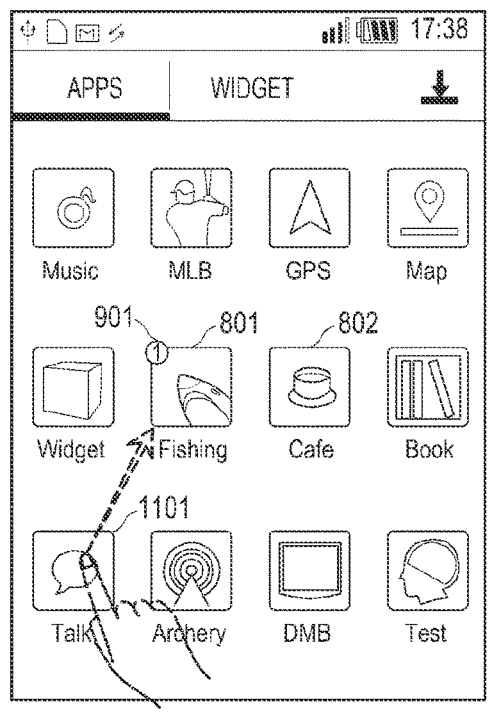
Figure 13:
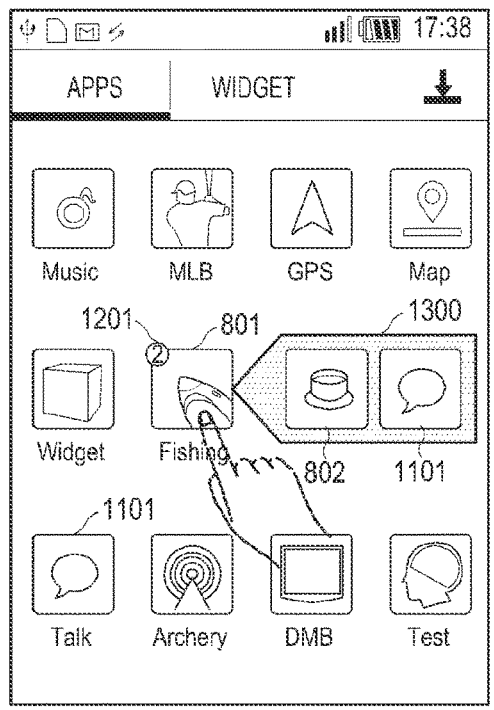

In the same manner, two or more objects may be linked to one object as illustrated in FIGS. 11 to 13. More specifically, after the second object 802 is linked to the first object 801, as illustrated in FIGS. 8 to 10, a third object 1101 may be additionally linked to the first object 801 by overlapping the third object 1101 over the first object 801, as illustrated in FIG. 11. Because the third object 1101 is linked to the first object 801 after the second object 802 is linked to the first object 801, applications corresponding to the second and third objects 802 and 1101 may be executed in a linked order of the second and third objects 802 and 1101. Specifically, link information may be stored in a linked order of objects and applications may be sequentially switched to, according to the stored link information.

For example, the second object 820 may be linked to the first object 801 by overlapping the second object 802 over the first object 801, and then the third object 1101 may be linked to the first object 801 by overlapping the third object 1101 over the first object 801. Upon input of a predetermined input value (e.g., an input value of the switch key) during execution of the first application corresponding to the first object 801, the second application corresponding to the second object 802, which is first linked to the first object 801, may be executed. Subsequently, upon input of the predetermined input value, a third application corresponding to the next linked third object 1101 may be executed. While two slave objects (i.e., the second object 802 and the third object 1101) may be linked to one master object (i.e., the first object 801) in FIGS. 11 to 13, three or more objects may be linked to a specific object in the same manner.

Referring to FIG. 12, a link indicator 1201 may be displayed in the display area of the first object 801 to indicate the existence of objects linked to the first object 801. For example, number '2' is displayed to indicate the existence of two objects linked to the first object 801, in FIG. 12.

Referring to FIG. 13, upon selection of the first object 801 (i.e., the master object), the first application corresponding to the first object 801 is not immediately executed because other objects are linked to the first object 801, as described above with respect to FIG. 10. The second and third objects 802 and 1101 linked to the first object 801 may be displayed in a link object display window 1300. The second and third objects 802 and 1101 may be displayed sequentially in their linked order. Accordingly, the user may view the link indicator 1201 displayed in the first object 801, and select the first object 801 to thereby identify which objects are linked to the first object 801 in the linked object display window 1300.

In an embodiment of the present invention, when the user selects a specific object, when at least one other object is linked to the specific object, the at least one other linked object may be displayed in the linked object display window 1300, as illustrated in FIG. 13, rather than immediately executing an application corresponding to the selected object. On the contrary, in the absence of any object linked to the selected object, the application corresponding to the selected object may be executed immediately.

In another embodiment of the present invention, many selection methods may be set to select a specific object. A first selection method may be designed so that an application corresponding to a selected application is executed, and a second selection method may be designed so that an object linked to a selected application is displayed. For example, when the first object 801 is touched for a short time, the first application corresponding to the first object 801 may be executed. When the first object 801 is touched for a long time, i.e., for a predetermined time or longer, at least one object (e.g., the second object 802 and the third object 1101 in FIG. 13) linked to the first object 801 may be displayed.

Figure 14:
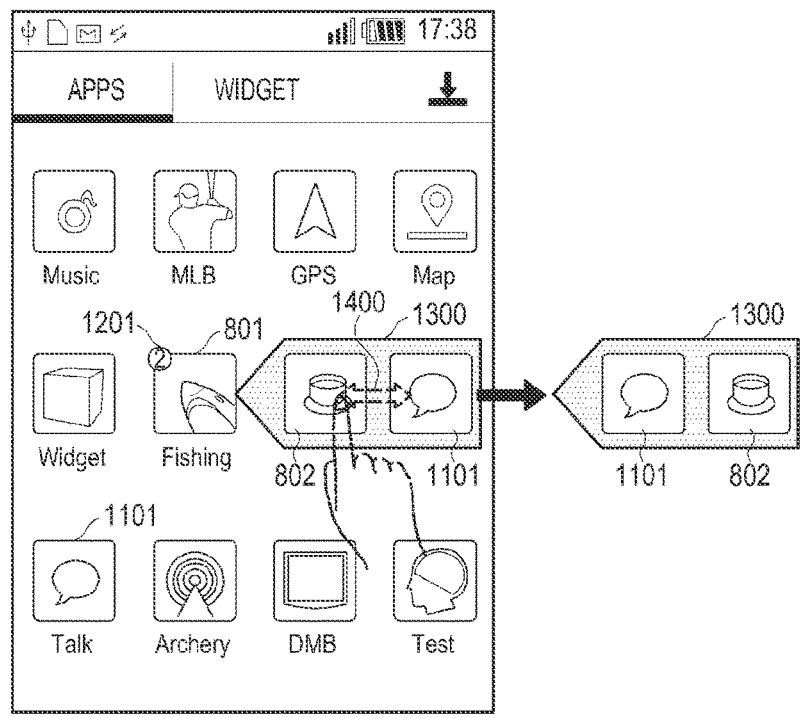

When a plurality of linked objects are displayed in the linked object display window 1300 in FIG. 13, the linked order may be changed by moving the plurality of linked objects. For example, when the second and third objects 802 and 1101 are sequentially linked to the first object 801, the second and third objects 802 and 1101 may be sequentially displayed from left to right in the linked object display window 1300 in their linked order, as illustrated in FIG. 14. When the user selects the second object 802 and drags it toward the third object 1101, the positions of the second and third objects 802 and 1101 may be exchanged, and thus, the third object 1101 may be moved to the left of the second object 802.

As the positions of the objects are changed, their linked order may be changed and stored. Specifically, while links are established in the order of the first object 801, the second object 802, and the third object 1101 before the position change, the links may be re-established in the order of the first object 801, the third object 1101, and the second object 802 after the position change illustrated in FIG. 14. Accordingly, upon input of a predetermined input value during execution of the first application corresponding to the first object 801, the third application corresponding to the third object 1101 may be executed, instead of the second application corresponding to the second object 802. Subsequently, upon input of the predetermined input value during execution of the third application corresponding to the third object 1101, the second application corresponding to the second object 802 may be executed.

Figure 15:
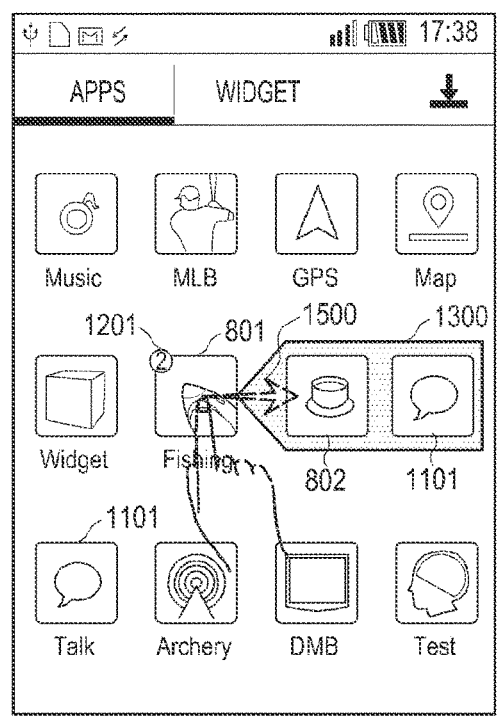
Figure 16:
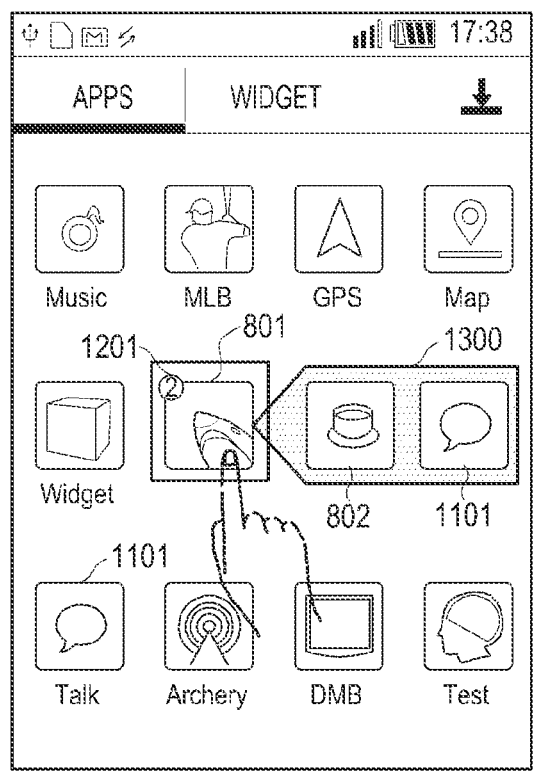

FIGS. 15 and 16 illustrate a method of executing an application corresponding to an object when objects are linked and upon selection of a master object, the linked object display window 1300 is displayed in the above-described manner.

For example, when the selected first object 801 is dragged to the slave objects displayed in the linked object display window 1300, as indicated by reference numeral 1500, the first application corresponding to the first object 801 may be executed and at least one linked slave object may be executed, upon input of a predetermined input value.

In an embodiment of the present invention, when the first object 801 is selected and then dragged only to a display area of the second object 802, the first and second applications corresponding to the first and second objects 801 and 802 may be sequentially executed. When the first object 801 is selected and then dragged to a display area of the third object 1101 across the display area of the second object 802, the first, second and third applications corresponding to the first, second and third objects 801, 802 and 1101 may be sequentially executed.

As illustrated in FIG. 16, when upon selection of the first object 801, the second and third objects 802 and 1101 are displayed in the linked object display window 1300, when only the first object 801 is selected, the linked objects (i.e., the second and third objects 802 and 1101) may be ignored and only the first application corresponding to the first object 801 may be executed.

As described above, upon selection of a specific master object to which another object is linked, an application corresponding to the master object may be executed immediately or the linked object may be displayed in an additional linked object display window, according to a predetermined method. With at least one linked object displayed in the linked object display window, only the application corresponding to the master object may be executed or at least one selected from the linked objects may be executed successively, according to a predetermined method.

As is apparent from the above description of embodiments of the present invention, when function switching occurs from one application to another application, an application related to a currently executed application may be executed immediately without invoking an idle screen, searching for the application, and executing the application.

Since frequently used applications are linked to each other, a related application can be executed rapidly without an additional complicated manipulation or screen switching.

It should be noted that the embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the embodiments of the present invention as described above. Alternatively, one or more processors operating in accordance with stored instructions may implement the functions associated with the embodiments of the present invention as described above. When such is the case, it is within the scope of the present disclosure that such instructions may be stored on one or more processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An apparatus for executing a plurality of objects displayed on a screen of an electronic device, the apparatus comprising:
    a touch screen; and
    a processor configured to:
    display the plurality of objects on the touch screen, each of the plurality of objects being used to execute an application upon selection of a respective object;
    identify a first gesture to move a second object on a first object among the plurality of objects displayed on the touch screen;
    in response to identifying the first gesture, link the second object to the first object;
    identify a second gesture for the first object among the plurality of objects displayed on the touch screen;
    in response to identifying the second gesture, identify whether the second object is linked to the first object selected by the second gesture;
    when it is identified that the second object is not linked to the first object, execute a first application corresponding to the first object and display a first application execution screen of the first application on the touch screen;
    when it is identified that the second object is linked to the first object, display the second object linked to the first object on the touch screen;
    in response to a third gesture for the first object, execute the first application and a second application corresponding to the second object linked to the first object and display the first application execution screen on the touch screen; and
    when a predetermined input value is received while the first application execution screen is being displayed, switch from the first application execution screen to a second application execution screen of the second application on the touch screen,
    wherein, when identifying a fourth gesture from the first object to a display area of at least one specific object linked to the first object after the plurality of objects linked to the first object are displayed, the processor is further configured to control sequential execution of the first application and at least one application corresponding to the at least one specific object.

2. The apparatus of claim 1, wherein the processor is further configured to:
    identify whether the first object overlaps the second object by the first gesture;
    when it is identified that the first object overlaps the second object, link the second object to the first object; and
    store link information about the first and second objects.

3. The apparatus of claim 2, wherein, when the first object and the second object are located within a predetermined distance, it is identified that the first object overlaps the second object.

4. The apparatus of claim 1, wherein the first object is a master object and the second object is a slave object.

5. The apparatus of claim 1, wherein the plurality of objects are linked to the first object, and applications corresponding to the linked plurality of objects are executed sequentially in order of linking to the first object.

6. The apparatus of claim 5, wherein, upon receipt of a predetermined input value from the input means during execution of an application corresponding to a last linked object among the linked plurality of linked objects, the first application corresponding to the first object is executed.

7. The apparatus of claim 1, wherein the processor is further configured to indicate existence of an object linked to the first object in a display area of the first object after storing the link information.

8. The apparatus of claim 7, wherein the processor is further configured to display a numeral indicating a number of objects linked to the first object in the display area of the first object after storing the link information.

9. The apparatus of claim 1, wherein, when the plurality of objects are linked to the first object,
    the processor is further configured to control sequential display of the linked objects in a predetermined direction in order of linking the plurality of objects to the first object.

10. The apparatus of claim 9, wherein, when one object selected from among the plurality of sequentially displayed objects is moved, the processor is further configured to control changing the linked order of the plurality of sequentially displayed objects.

11. The apparatus of claim 1, wherein each of the objects is one of a shortcut icon used to execute an application available in the electronic device, a widget, an icon representing text of a file format, a photo, and a folder.

12. A method for executing a plurality of objects displayed on a screen of an electronic device, the method comprising the steps of:
    displaying the plurality of objects on a touch screen, each of the plurality of objects being used to execute an application upon selection of a respective object;
    identifying a first gesture to move a second object on a first object among the plurality of objects displayed on the touch screen;

in response to identifying the first gesture, linking the second object to the first object;

identifying a second gesture for the first object among the plurality of objects displayed on the touch screen;

in response to identifying the second gesture, identifying whether the second object is linked to the first object selected by the second gesture;

when it is identified that the second object is not linked to the first object, executing a first application corresponding to the first object and displaying a first application execution screen of the first application on the touch screen;

when it is identified that the second object is linked to the first object, displaying the second object linked to the first object on the touch screen;

in response to a third gesture for the first object, executing the first application and a second application corresponding to the second object linked to the first object and displaying the first application execution screen on the touch screen; and when a predetermined input value is received while the first application execution screen is being displayed, switching from the first application execution screen to a second application execution screen of the second application on the touch screen, wherein, when identifying a fourth gesture from the first object to a display area of at least one specific object linked to the first object after the plurality of objects linked to the first object are displayed, the first application and at least one application corresponding to the at least one specific object are sequentially executed.

13. The method of claim 12, wherein linking the first object and the second object comprises:

identifying whether the first object overlaps the second object by the first gesture;

when it is identified that the first object overlaps the second object, linking the second object to the first object; and storing link information about the first and second objects.

14. The method of claim 13, wherein identifying whether the first object overlaps the second object comprises identifying that the first object overlaps the second object, when the first object and the second object are located within a predetermined distance.

15. The method of claim 12, wherein the first object is a master object and the second object is a slave object.

16. The method of claim 12, wherein the plurality of objects are linked to the first object and applications corresponding to the linked objects are executed sequentially in order of linking to the first object.

17. The method of claim 16, wherein, upon receipt of a predetermined input value from the input means during execution of an application corresponding to a last linked object among the linked plurality of objects, the first application corresponding to the first object is executed.

18. The method of claim 12, further comprising indicating existence of an object linked to the first object in a display area of the first object after storing the link information.

19. The method of claim 18, wherein the indicating existence of the object linked to the first object comprises displaying a numeral indicating a number of objects linked to the first object in the display area of the first object after storing the link information.

20. The method of claim 12, wherein, when the plurality of objects are linked to the first object, the linked objects are sequentially displayed in a predetermined direction in order of linking the plurality of objects to the first object.

21. The method of claim 20, wherein, when one object selected from among the plurality of sequentially displayed objects is moved, the linked order of the plurality of sequentially displayed objects is changed.

22. The method of claim 12, wherein each of the objects is one of a shortcut icon used to execute an application available in the electronic device, a widget, an icon representing text of a file format, a photo, and a folder.

* * * * *